(12) United States Patent
Speldrich et al.

(10) Patent No.: US 8,485,031 B2
(45) Date of Patent: *Jul. 16, 2013

(54) SENSOR ASSEMBLY WITH HYDROPHOBIC FILTER

(75) Inventors: Jamie Speldrich, Freeport, IN (US);
Scott Edward Beck, Murphy, TX (US);
Phil Foster, Murphy, TX (US); Ru Wang, Nanjing (CN)

(73) Assignee: Honeywell International Inc., Morristown, NJ (US)

( * ) Notice: Subject to any disclaimer, the term of this patent is extended or adjusted under 35 U.S.C. 154(b) by 0 days.
This patent is subject to a terminal disclaimer.

(21) Appl. No.: 13/361,764

(22) Filed: Jan. 30, 2012

(65) Prior Publication Data
US 2012/0186336 A1   Jul. 26, 2012

Related U.S. Application Data

(63) Continuation of application No. 12/729,173, filed on Mar. 22, 2010, now Pat. No. 8,113,046.

(51) Int. Cl.
*G01F 1/68* (2006.01)
(52) U.S. Cl.
USPC ...................................................... 73/204.22
(58) Field of Classification Search
USPC .............................. 73/202.22, 204.21, 204.26
See application file for complete search history.

(56) References Cited

U.S. PATENT DOCUMENTS

| | | | |
|---|---|---|---|
| 2,746,296 A | 5/1956 | Stover | |
| 3,216,249 A | 11/1965 | Joel | |
| 3,410,287 A | 11/1968 | Van Der Heyden et al. | |
| 3,433,069 A | 3/1969 | Trageser | |
| 3,559,482 A | 2/1971 | Baker et al. | |
| 3,640,277 A | 2/1972 | Adelberg | |
| 3,785,206 A | 1/1974 | Benson et al. | |
| 3,830,104 A | 8/1974 | Gau | |

(Continued)

FOREIGN PATENT DOCUMENTS

| | | |
|---|---|---|
| DE | 3905746 | 8/1990 |
| DE | 102004019521 | 11/2005 |

(Continued)

OTHER PUBLICATIONS

"Schematic Cross-Section for AWM43600," 1 page, prior to Jan. 31, 2011.

(Continued)

*Primary Examiner* — Jewel V Thompson
(74) *Attorney, Agent, or Firm* — Seager Tufte & Wickhem LLC.

(57) ABSTRACT

The present disclosure relates to methods and devices for reducing moisture, dust, particulate matter, and/or other contaminates entering a sensor. A sensor assembly may include a housing with an inlet flow port and an outlet flow port. The housing may define a fluid channel extending between the inlet flow port and the outlet flow port, with a sensor positioned in the housing and exposed to the fluid channel. The sensor may be configured to sense a measure related to the flow rate of a fluid flowing through the fluid channel. A hydrophobic filter may be situated in the fluid channel, sometimes upstream of the sensor. When so configured, and during operation of the sensor assembly, a fluid may pass through the inlet flow port, through the hydrophobic filter, across the sensor, and through the outlet flow port.

20 Claims, 9 Drawing Sheets

U.S. PATENT DOCUMENTS

| | | | |
|---|---|---|---|
| 3,838,598 A | 10/1974 | Tompkins | |
| 3,895,531 A | 7/1975 | Lambert | |
| 3,952,577 A | 4/1976 | Hayes et al. | |
| 3,981,074 A | 9/1976 | Yamamoto et al. | |
| 4,030,357 A | 6/1977 | Wemyss | |
| 4,041,757 A | 8/1977 | Baker et al. | |
| 4,100,801 A | 7/1978 | LeMay | |
| 4,326,214 A | 4/1982 | Trueblood | |
| 4,343,194 A | 8/1982 | Dehart et al. | |
| 4,411,292 A | 10/1983 | Schiller | |
| 4,418,723 A | 12/1983 | Koni et al. | |
| 4,444,060 A | 4/1984 | Yamamoto | |
| RE31,570 E | 5/1984 | Drexel | |
| 4,478,076 A | 10/1984 | Bohrer | |
| 4,478,077 A | 10/1984 | Bohrer et al. | |
| 4,481,828 A | 11/1984 | Cheng | |
| 4,494,405 A | 1/1985 | Oosuga et al. | |
| 4,501,144 A | 2/1985 | Higashi et al. | |
| 4,546,655 A | 10/1985 | Victor | |
| 4,581,945 A | 4/1986 | Rusz | |
| 4,648,270 A | 3/1987 | Johnson et al. | |
| 4,653,321 A | 3/1987 | Cunningham et al. | |
| 4,655,088 A | 4/1987 | Adams | |
| 4,668,102 A | 5/1987 | Mott | |
| 4,672,997 A | 6/1987 | Landis et al. | |
| 4,677,858 A | 7/1987 | Ohnhaus | |
| 4,696,194 A | 9/1987 | Taylor | |
| 4,768,386 A | 9/1988 | Taddeo | |
| 4,790,181 A | 12/1988 | Aine | |
| 4,800,754 A | 1/1989 | Korpi | |
| 4,825,704 A | 5/1989 | Aoshima et al. | |
| 4,829,818 A | 5/1989 | Bohrer | |
| 4,839,038 A | 6/1989 | Mclain, II | |
| 4,856,328 A | 8/1989 | Johnson | |
| 4,900,242 A | 2/1990 | Maus et al. | |
| 4,961,344 A | 10/1990 | Rodder | |
| 4,976,283 A | 12/1990 | Wildfang et al. | |
| 5,000,478 A | 3/1991 | Kerastas | |
| 5,050,429 A | 9/1991 | Nishimoto et al. | |
| 5,063,786 A | 11/1991 | Sanderson et al. | |
| 5,063,787 A | 11/1991 | Khuzai et al. | |
| 5,081,866 A | 1/1992 | Ochiai et al. | |
| 5,088,332 A | 2/1992 | Merilainen et al. | |
| 5,107,441 A | 4/1992 | Decker | |
| 5,137,026 A | 8/1992 | Waterson et al. | |
| 5,161,410 A | 11/1992 | Davey et al. | |
| 5,220,830 A | 6/1993 | Bonne | |
| 5,231,877 A | 8/1993 | Henderson | |
| 5,249,462 A | 10/1993 | Bonne | |
| 5,253,517 A | 10/1993 | Molin et al. | |
| 5,295,394 A | 3/1994 | Suzuki | |
| 5,303,584 A | 4/1994 | Ogasawara et al. | |
| 5,319,973 A | 6/1994 | Crayton et al. | |
| 5,332,005 A | 7/1994 | Baan | |
| 5,341,841 A | 8/1994 | Schaefer | |
| 5,341,848 A | 8/1994 | Laws | |
| 5,357,793 A | 10/1994 | Jouwsma | |
| 5,379,650 A | 1/1995 | Kofoed et al. | |
| 5,385,046 A | 1/1995 | Yamakawa et al. | |
| 5,400,973 A | 3/1995 | Cohen | |
| 5,404,753 A | 4/1995 | Hecht et al. | |
| 5,481,925 A | 1/1996 | Woodbury | |
| 5,535,633 A | 7/1996 | Kofoed et al. | |
| 5,537,870 A | 7/1996 | Zurek et al. | |
| 5,581,027 A | 12/1996 | Juntunen | |
| 5,609,303 A | 3/1997 | Cohen | |
| 5,634,592 A | 6/1997 | Campau | |
| 5,672,832 A | 9/1997 | Cucci et al. | |
| 5,717,145 A | 2/1998 | Yasuhara et al. | |
| 5,735,267 A | 4/1998 | Tobia | |
| 5,736,651 A | 4/1998 | Bowers | |
| 5,741,968 A | 4/1998 | Arai | |
| 5,750,892 A | 5/1998 | Huang et al. | |
| 5,763,787 A | 6/1998 | Gravel et al. | |
| 5,781,291 A | 7/1998 | So et al. | |
| 5,789,660 A | 8/1998 | Kofoed et al. | |
| 5,792,958 A | 8/1998 | Speldrich | |
| 5,817,950 A | 10/1998 | Wiklund et al. | |
| 5,829,685 A | 11/1998 | Cohen | |
| 5,844,135 A | 12/1998 | Brammer et al. | |
| 5,861,561 A | 1/1999 | Van Cleve et al. | |
| 5,866,824 A | 2/1999 | Schieber | |
| 5,942,694 A | 8/1999 | Robins et al. | |
| 6,044,716 A | 4/2000 | Yamamoto | |
| 6,119,730 A | 9/2000 | McMillan | |
| 6,128,963 A | 10/2000 | Bromster | |
| 6,142,014 A | 11/2000 | Rilling | |
| 6,164,143 A | 12/2000 | Evans | |
| 6,247,495 B1 | 6/2001 | Yamamoto et al. | |
| 6,308,553 B1 | 10/2001 | Bonne et al. | |
| 6,312,389 B1 | 11/2001 | Kofoed et al. | |
| 6,322,247 B1 | 11/2001 | Bonne et al. | |
| 6,526,822 B1 | 3/2003 | Maeda et al. | |
| 6,527,385 B2 | 3/2003 | Koitabashi et al. | |
| 6,543,449 B1 | 4/2003 | Woodring et al. | |
| 6,553,808 B2 | 4/2003 | Bonne et al. | |
| 6,561,021 B2 | 5/2003 | Uramachi et al. | |
| 6,579,087 B1 | 6/2003 | Vrolijk | |
| 6,591,674 B2 | 7/2003 | Gehman et al. | |
| 6,655,207 B1 | 12/2003 | Speldrich et al. | |
| 6,681,623 B2 | 1/2004 | Bonne et al. | |
| 6,715,339 B2 | 4/2004 | Bonne et al. | |
| 6,742,399 B2 | 6/2004 | Kunz et al. | |
| 6,761,165 B2 | 7/2004 | Strickland, Jr. | |
| 6,769,299 B2 | 8/2004 | Forster et al. | |
| 6,779,393 B1 | 8/2004 | Muller et al. | |
| 6,779,395 B2 | 8/2004 | Hornung et al. | |
| 6,826,966 B1 | 12/2004 | Karbassi et al. | |
| 6,871,534 B1 | 3/2005 | Hamada et al. | |
| 6,871,537 B1 | 3/2005 | Gehman et al. | |
| 6,886,401 B2 | 5/2005 | Ito et al. | |
| 6,901,795 B2 | 6/2005 | Naguib et al. | |
| 6,904,799 B2 | 6/2005 | Cohen et al. | |
| 6,904,907 B2 | 6/2005 | Speldrich et al. | |
| 6,907,787 B2 | 6/2005 | Cook et al. | |
| 6,915,682 B2 | 7/2005 | Renninger et al. | |
| 6,928,865 B2 | 8/2005 | Ito et al. | |
| 6,957,586 B2 | 10/2005 | Sprague | |
| 7,000,298 B2 | 2/2006 | Cook et al. | |
| 7,000,612 B2 | 2/2006 | Jafari et al. | |
| 7,028,560 B2 | 4/2006 | Castillon Levano | |
| 7,032,463 B2 | 4/2006 | Misholi et al. | |
| 7,036,366 B2 | 5/2006 | Emmert et al. | |
| 7,043,978 B2 | 5/2006 | Goka et al. | |
| 7,059,184 B2 | 6/2006 | Kanouda et al. | |
| 7,100,454 B2 | 9/2006 | Hasunuma | |
| 7,107,834 B2 | 9/2006 | Meneghinin et al. | |
| 7,121,139 B2 | 10/2006 | Shajii et al. | |
| 7,243,541 B1 | 7/2007 | Bey et al. | |
| 7,258,003 B2 | 8/2007 | Padmanabhan et al. | |
| 7,278,309 B2 | 10/2007 | Dmytriw et al. | |
| 7,278,326 B2 | 10/2007 | Kobayashi et al. | |
| 7,337,677 B2 | 3/2008 | Mizohata | |
| 7,343,823 B2 | 3/2008 | Speldrich | |
| 7,347,785 B2 | 3/2008 | Worman, Jr. et al. | |
| 7,353,719 B2 | 4/2008 | Hiura et al. | |
| 7,373,819 B2 | 5/2008 | Engler et al. | |
| 7,386,166 B2 | 6/2008 | Curry et al. | |
| 7,430,918 B2 | 10/2008 | Selvan et al. | |
| 7,454,984 B1 | 11/2008 | Ross et al. | |
| 7,464,611 B2 | 12/2008 | Matter et al. | |
| 7,472,580 B2 | 1/2009 | Lyons et al. | |
| 7,479,255 B2 | 1/2009 | Otani et al. | |
| 7,513,149 B1 | 4/2009 | Ricks | |
| 7,516,761 B2 | 4/2009 | Setescak | |
| 7,520,051 B2 | 4/2009 | Becke et al. | |
| 7,549,332 B2 | 6/2009 | Yamashita et al. | |
| 7,568,383 B2 | 8/2009 | Colvin et al. | |
| 7,603,898 B2 | 10/2009 | Speldrich | |
| 7,631,562 B1 | 12/2009 | Speldrich | |
| 7,647,835 B2 | 1/2010 | Speldrich | |
| 7,654,157 B2 | 2/2010 | Speldrich | |
| 7,661,303 B2 | 2/2010 | Kohno et al. | |
| 7,698,938 B2 | 4/2010 | Inagaki et al. | |
| 7,698,958 B2 | 4/2010 | Matter et al. | |
| 7,704,774 B2 | 4/2010 | Mayer et al. | |
| 7,730,793 B2 | 6/2010 | Speldrich | |

| | | | |
|---|---|---|---|
| 7,757,553 B2 | 7/2010 | Meier et al. | |
| 7,793,410 B2 | 9/2010 | Padmanabhan et al. | |
| 7,805,986 B2 | 10/2010 | Colvin et al. | |
| 7,832,269 B2 | 11/2010 | Bey, Jr. et al. | |
| 7,878,980 B2 | 2/2011 | Ricciardelli | |
| 7,891,238 B2 | 2/2011 | Becke et al. | |
| 7,892,488 B2 | 2/2011 | Speldrich et al. | |
| 8,113,046 B2 * | 2/2012 | Speldrich et al. | 73/204.22 |
| 2002/0078744 A1 | 6/2002 | Gehman et al. | |
| 2003/0062045 A1 | 4/2003 | Woodring et al. | |
| 2004/0118200 A1 | 6/2004 | Hornung et al. | |
| 2004/0163461 A1 | 8/2004 | Ito et al. | |
| 2004/0177703 A1 | 9/2004 | Schumacher et al. | |
| 2005/0016534 A1 | 1/2005 | Ost | |
| 2005/0039809 A1 | 2/2005 | Speldrich | |
| 2005/0235757 A1 | 10/2005 | De Jonge et al. | |
| 2005/0247106 A1 | 11/2005 | Speldrich et al. | |
| 2005/0247107 A1 | 11/2005 | Speldrich et al. | |
| 2006/0017207 A1 | 1/2006 | Bechtold et al. | |
| 2006/0101908 A1 | 5/2006 | Meneghini et al. | |
| 2006/0201247 A1 | 9/2006 | Speldrich et al. | |
| 2006/0225488 A1 | 10/2006 | Speldrich | |
| 2007/0176010 A1 | 8/2007 | Figi et al. | |
| 2007/0295068 A1 | 12/2007 | Kozawa et al. | |
| 2008/0163683 A1 | 7/2008 | Becke et al. | |
| 2008/0202929 A1 | 8/2008 | Chapples et al. | |
| 2009/0265144 A1 | 10/2009 | Speldrich | |
| 2010/0013165 A1 | 1/2010 | Speldrich et al. | |
| 2010/0101332 A1 | 4/2010 | Speldrich | |
| 2010/0154559 A1 | 6/2010 | Speldrich | |
| 2010/0269583 A1 | 10/2010 | Jasnie | |
| 2011/0226052 A1 | 9/2011 | Speldrich et al. | |
| 2011/0226053 A1 | 9/2011 | Sorenson et al. | |
| 2011/0247411 A1 | 10/2011 | Speldrich | |
| 2012/0035866 A1 | 2/2012 | Qasimi et al. | |

FOREIGN PATENT DOCUMENTS

| | | |
|---|---|---|
| EP | 0094497 | 11/1983 |
| EP | 0255056 | 2/1988 |
| EP | 1655123 | 5/2006 |
| EP | 1691175 | 8/2006 |
| EP | 1959242 | 8/2008 |
| EP | 2068129 | 10/2009 |
| EP | 2157411 | 2/2010 |
| EP | 2199758 | 6/2010 |
| EP | 2270441 | 1/2011 |
| FR | 377743 | 3/1907 |
| GB | 2123564 | 2/1984 |
| JP | 49120131 | 11/1974 |
| JP | 58221119 | 12/1983 |
| JP | 3099230 | 4/1991 |
| JP | 4069521 | 3/1992 |
| JP | 7083713 | 3/1995 |
| JP | 10239130 | 9/1998 |
| JP | 10307047 | 11/1998 |
| WO | 9221940 | 12/1992 |
| WO | 9315373 | 8/1993 |
| WO | 9517651 | 6/1995 |
| WO | 0111322 | 2/2001 |
| WO | 0161282 | 8/2001 |
| WO | 0198736 | 12/2001 |
| WO | 2006131531 | 12/2006 |
| WO | 2007095528 | 8/2007 |
| WO | 2007137978 | 12/2007 |
| WO | 2008070603 | 6/2008 |

OTHER PUBLICATIONS

Bodycote, "Competitive Teardown Analysis of Sensirion EMI," Bodycote Testing Group, 24 pages, Oct. 15, 2007.
Bodycote, "Honeywell Sensing and Control, Sensiron SDP610 Competitive Teardown Analysis," 15 pages, Feb. 19, 2009.
U.S. Appl. No. 13/018,017, filed Jan. 31, 2011.
U.S. Appl. No. 13/018,037, filed Jan. 31, 2011.
Honeywell, "Airflow Sensors Line Guide," 6 pages, Apr. 2010.
Honeywell, "Airflow Sensors Line Guide," 6 pages, Nov. 2010.
Honeywell, "Airflow, Force and Pressure Sensors," Product Range Guide, 20 pages, Mar. 2011.
Honeywell, "Airflow, Force, and Pressure Sensors," Product Range Guide, 20 pages, Apr. 2010.
Honeywell, "AWM43600V, Issue No. 4," 1 page, Jul. 29, 1996.
Honeywell, "AWM43600V, Part No. SS12177," 1 page, Jul. 10, 1998.
Honeywell, "Housing, Flowtube, Drawing 50005182," 1 page, Sep. 2, 2004.
Honeywell, "Housing, Plastic, Drawing 050.1.156," 1 page, Jul. 8, 1998.
Honeywell, "Housing, Subassembly, Drawing SS-12148," 1 page, Oct. 14, 1998.
Honeywell, "Mass Airflow Sensors, AWM720P1 Airflow," 4 pages, prior to Mar. 22, 2010.
Honeywell, "Mass Airflow Sensors, AWM9000 Airflow," 6 pages, 2003.
Honeywell, "Reference and Application Data, Microbridge Airflow Sensors," 1 page, prior to Mar. 22, 2010.
Honeywell, "Sensing and Control Interactive Catalog," 4 pages, prior to Mar. 22, 2010.
Honeywell, "Tubing, Plastic, Drawing SS-12062," 1 page, Apr. 5, 1999.
Honeywell, "Tubing, Plastic, Drawing SS-12160," 1 page, drawn Jan. 28, 1998.

* cited by examiner

SENSOR ASSEMBLY WITH HYDROPHOBIC FILTER

This application is a continuation of U.S. application Ser. No. 12/729,173, entitled "SENSOR ASSEMBLY WITH HYDROPHOBIC FILTER", filed on Mar. 22, 2010, which is hereby incorporated by reference.

RELATED APPLICATION

This application is related to U.S. application Ser. No. 12/729,145, entitled "FLOW SENSOR ASSEMBLY WITH POROUS INSERT", filed Mar. 22, 2010, which is hereby incorporated by reference.

FIELD

The present disclosure relates generally to sensors, and more particularly, to methods and devices for reducing moisture, dust, particulate matter and/or other contaminants in a sensor.

BACKGROUND

Sensors, such as pressure and flow sensors, are often used to sense the pressure and/or flow of a fluid (e.g. gas or liquid) in a fluid channel. Such sensors are often used in a wide variety of applications including, for example, medical applications, flight control applications, industrial process applications, combustion control applications, weather monitoring applications, as well as many others. In some instances, moisture, dust, particulate matter, and/or other contaminants can enter the sensor during use. Over time, such contaminants can impact the accuracy, repeatability, functionality and/or other aspects of the sensor. For example, moisture in a sensor can increase corrosion or electromigration in the flow sensor itself, which may impact the accuracy, repeatability, functionality and/or other aspects of the sensor. Also, dust, particulate matter, or other contaminants can build-up and possibly obstruct the sensor. Therefore, there is a need for new and improved systems and methods for reducing moisture, dust, particulate matter, and/or other contaminants from entering a sensor.

SUMMARY

The present disclosure relates generally to sensors, and more particularly, to methods and devices for reducing moisture, dust, particulate matter, and/or other contaminants in a sensor. In one illustrative embodiment, a flow sensor assembly includes a housing with an inlet flow port and an outlet flow port. The housing may define a fluid channel extending between the inlet flow port and the outlet flow port, with a flow sensor positioned in the housing and exposed to the fluid channel. The flow sensor may sense a measure related to the flow rate of the fluid flowing through the fluid channel. A hydrophobic filter may be situated in or adjacent to the fluid channel, sometimes upstream of the flow sensor. When so configured, and during operation of the flow sensor assembly, the fluid may pass through the hydrophobic filter and across the flow sensor. The hydrophobic filter may be configured to reduce moisture ingress into the flow sensor, while still allowing fluid flow through the flow channel and past the flow sensor. While this example includes a flow sensor, it is contemplated that a hydrophobic filter may be used in conjunction with many other types of sensors including pressure sensors, humidity sensors, temperature sensors, or any other type of sensor that is exposed to a fluid (e.g. gas or liquid).

The preceding summary is provided to facilitate an understanding of some of the innovative features unique to the present disclosure and is not intended to be a full description. A full appreciation of the disclosure can be gained by taking the entire specification, claims, drawings, and abstract as a whole.

BRIEF DESCRIPTION

The disclosure may be more completely understood in consideration of the following detailed description of various illustrative embodiments of the disclosure in connection with the accompanying drawings, in which.

DESCRIPTION

Figure 1:
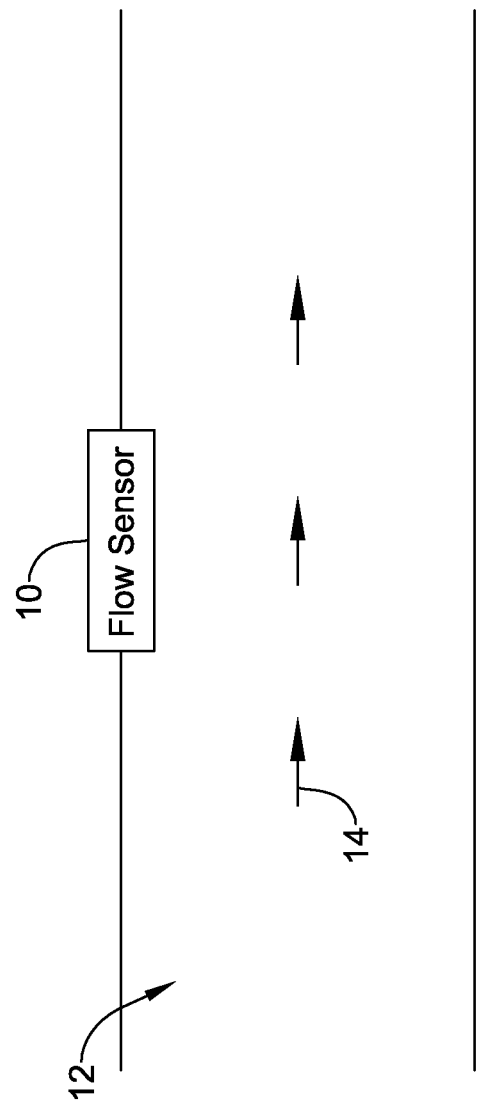
FIG. 1 is a schematic diagram of an illustrative flow sensor for measuring a fluid flow rate of a fluid passing through a fluid channel.

The following description should be read with reference to the drawings wherein like reference numerals indicate like elements throughout the several views. The description and drawings show several illustrative embodiments and are not meant to be limiting in any way.

While the illustrative embodiments described below includes a flow sensor, it is contemplated that a filter may be used in conjunction with many other types of sensors including pressure sensors, humidity sensors, temperature sensors, or any other type of sensor that is exposed to a fluid (e.g. gas or liquid).

FIG. 1 is a schematic diagram of an illustrative flow sensor 10 for measuring a fluid flow rate of a fluid flow 14 passing through a fluid channel 12. The term "fluid" as used herein can refer to a gas or a liquid, depending on the application. In the illustrative embodiment, the flow sensor 10 may be exposed to and/or disposed in the fluid channel 12 to measure one or more properties of the fluid flow 14. For example, the flow sensor 10 may measure the mass flow and/or velocity of the fluid flow 14 using one or more thermal sensors (e.g. see FIG. 2), pressure sensors, acoustical sensors, optical sensors, pitot tubes, and/or any other suitable sensor or sensor combination, as desired. In some cases, the flow sensor 10 may be a microbridge or a Microbrick™ sensor assembly available from the assignee of the present application, but this is not required. Some illustrative methods and sensor configurations that are considered suitable for measuring the mass flow and/or velocity of the fluid flow 14 are disclosed in, for example, U.S. Pat. Nos. 4,478,076; 4,478,077; 4,501,144; 4,581,928; 4,651,564; 4,683,159; 5,050,429; 6,169,965; 6,223,593; 6,234,016; 6,502,459; 7,278,309; 7,513,149; and 7,647,842. It is contemplated that flow sensor 10 may include any of these flow sensor configurations and methods, as desired. It must be recognized, however, that flow sensor 10 may be any suitable flow sensor, as desired.

In the illustrative example, the fluid channel 12 may experience a range of flow rates of fluid flow 14. For example, the fluid channel 12 may include a high-volume fluid flow, a mid-volume fluid flow, or a low-volume fluid flow. Example fluid flow applications can include, but are not limited to, respirometers, flow meters, velocimeters, flight control, industrial process stream, combustion control, weather monitoring, as well as any other suitable fluid flow applications, as desired.

Figure 2:
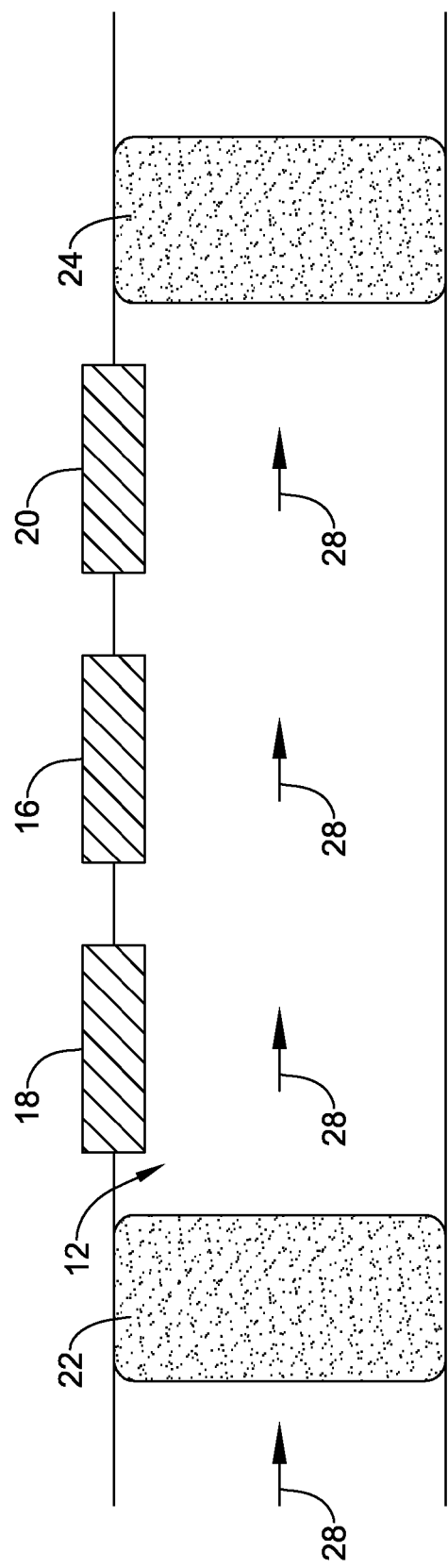
FIG. 2 is a schematic diagram of an illustrative thermal flow sensor assembly useful for measuring the flow rate of a fluid passing through a fluid channel.

Turning now to FIG. 2, which is a schematic diagram of an illustrative thermal flow sensor assembly for measuring the flow rate of a fluid flow 14 passing through a fluid channel 12. In the illustrative embodiment, the flow sensor assembly may include one or more heater elements, such as heater element 16, and one or more sensor elements 18 and 20, for sensing a flow rate of a fluid 28 in the fluid channel 12.

As illustrated in FIG. 2, the flow sensor assembly may also include one or more filters 22 and/or 24 positioned in the fluid channel 12 upstream and/or downstream of the heater element 16 and the one or more sensor elements 18 and 20. The filter(s) 22 and/or 24 may be configured to reduce moisture, dust, and/or other contaminants from the fluid flow 28 passing through the flow sensor housing and/or produce a desired or predetermined pressure drop along the fluid channel at a given flow rate. In some instances, the reduction of moisture, dust, and/or other contaminants in the fluid flow may provide a more consistent, reliable, accurate, repeatable, and stable output of the flow sensor for a longer period of time due to the reduction of corrosion, electromigration, and/or contaminant build-up obstructing fluid flow in the flow sensor.

As illustrated in FIG. 2, the flow sensor assembly may include a heater element 16, a first sensor element 18 positioned upstream of the heater element 16, and a second sensor element 20 positioned downstream of the heater element 16. While the first sensor element 18 is shown as upstream of the heater element 16, and the second sensor element 20 is shown as downstream of the heater element 16, this is not meant to be limiting. It is contemplated that, in some embodiments, the fluid channel 12 may be a bi-directional fluid channel such that, in some cases, the first sensor element 18 is downstream of the heater element 16 and the second sensor element 20 is upstream of the heater element 16. In some instances only one sensor element may be provided, and in other embodiments, three or more sensor elements may be provided. In some instances, both sensor elements 18 and 20 may be positioned upstream (or downstream) of the heater element 16.

In some cases, the first sensor element 18 and the second sensor element 20 may be thermally sensitive resistors that have a relatively large positive or negative temperature coefficient, such that the resistance varies with temperature. In some cases, the first and second sensing elements 18 and 20 may be thermistors. In some instances, the first sensor element 18, the second sensor element 20, and any additional sensor elements may be arranged in a Wheatstone bridge configuration, but this is not required in all embodiments.

In the example shown, when no fluid flow is present in the fluid channel 12 and the heater element 16 is heated to a temperature higher than the ambient temperature of the fluid in the fluid flow 28, a temperature distribution may be created and transmitted in a generally symmetrical distribution about the heater element 16 to upstream sensor element 18 and downstream sensor element 20. In this example, upstream sensor element 18 and downstream sensor element 20 may sense the same or similar temperature (e.g. within 25 percent, 10 percent, 5 percent, 1 percent, 0.001 percent, etc.). In some cases, this may produce the same or similar output voltage in the first sensor element 18 and the second sensor element 20.

When a fluid flow 28 is present in the fluid channel 12 and the heater element 16 is heated to a temperature higher than the ambient temperature of the fluid in the fluid flow 28, the symmetrical temperature distribution may be disturbed and the amount of disturbance may be related to the flow rate of the fluid flow 28 in the fluid channel 12. The flow rate of the fluid flow 28 may cause the upstream sensor element 18 to sense a relatively cooler temperature than the downstream sensor element 20. In other words, the flow rate of the fluid flow 28 may cause a temperature differential between the upstream sensor element 18 and the downstream sensor element 20 that is related to the flow rate of the fluid flow 28 in the fluid channel 12. The temperature differential between the upstream sensor element 18 and the downstream sensor element 20 may result in an output voltage differential between the upstream sensor element 18 and the downstream sensor element 20.

In another illustrative embodiment, the mass flow and/or velocity of the fluid flow 28 may be determined by providing a transient elevated temperature condition in the heater element 16, which in turn, causes a transient elevated temperature condition (e.g. heat pulse) in the fluid flow 28. When there is a non-zero flow rate in the fluid flow 28, the upstream sensor element 18 may receive a transient response later than the downstream sensor element 20. The flow rate of the fluid flow 28 can then be computed using the time lag between the upstream sensor element 18 and downstream sensor element 20, or between the time the heater is energized and when the corresponding elevated temperature condition (e.g. heat pulse) is sensed by one of the sensors, such as the downstream sensor 20.

In the illustrative embodiment, the one or more filters 22 and 24 may reduce the amount of moisture, dust, and/or other contaminants in fluid flow 28 across the heater element 16 and sensing elements 18 and 20. In some cases, the filters 22 and 24 may include a plurality of pores sized to filter out and/or reduce the presence of moisture, dust, particulate matter, and/or other contaminants in the fluid flow 28 across the heater element 16 and sensing elements 18 and 20. In some embodiments, the filters 22 and 24 can have a porous structure with pore sizes in the range of microns to millimeter depending on the desired filtration rate and filtration application. In some embodiments, the filters 22 and 24 can have lengths in the flow direction of less than one inch, one inch, or greater than one inch, depending on the desired filtration, as well as other factors. In some cases, the filters 22 and 24 can have the same pore size and length or, in other cases, can have different pore sizes and lengths, as desired.

As illustrated, filter 22 is positioned in the fluid channel 12 upstream of the heater element 16 and one or more sensor elements 18 and 20, and filter 24 is positioned in the fluid channel 12 downstream of the heater element 16 and one or more sensor elements 18 and 20. In some embodiments, however, it is contemplated that only one filter 22 or 24 may be provide in the fluid channel 12, such as for example, only the upstream filter. It is also contemplated that multiple upstream and/or downstream filters may be used, as desired, sometimes with different filter characteristics.

In one example, to reduce the introduction of dust, particulate matter, and/or other contaminants in the flow sensor, a filter 22 or 24 may be provided upstream of the heater element 16 and one or more sensor elements 18 and 20. In another example, to reduce the introduction of moisture into the flow sensor, both filters 22 and 24 may be provided upstream and downstream of the heater element 16 and one or more sensor elements 18 and 20. In bi-directional flow sensor applications, for example, both filter 22 and 24 may be provided.

In some embodiments, the filters 22 and 24 may include suitable filter materials to reduce moisture ingress into the flow sensor, such as, hydrophobic or hydrophobic treated material. For example, the filter material may include woven fibers, such as, for example, a precision woven mesh, having hydrophobic treatments, non-woven fibers (e.g. felt) with hydrophobic treatment, polytetraflouride (PTFE), expanded polytetraflouride (ePTFE), porous polymer and/or porous fiber material with hydrophobic treatment (e.g. sintered polymer particulates), and/or any other material that, for example, helps reduce moisture ingress in a fluid flowing through the flow channel 12. Examples ePTFE materials include Teflon® available from DuPont, and Gore-Tex® available from W.L. Gore & Associates and Versapore membrane available from PALL Life Sciences. Examples of hydrophobic porous materials are UHMW Polyethylene or PE copolymers available from GenPore. An example of a precision woven mesh with a hydrophobic treatment is Acoustex available from SAA-TItech and hydrophobically treated acoustic filters available from Sefar Filtration Incorporated. An example of non woven fiber material with hydrophobic treatment is Gore Acoustic filter GAW102 available from W.L Gore & Associates. Other materials that can be used include, for example, foams (e.g. reticulated foams, open-cell foams), polyurethane, polyethylene (PE), nylon, polyethylene terephthalate (PET), polybutylene terephthalate (PBT), polypropylene (PP), pressed metal, and/or any other suitable material, as desired. Further, in some embodiments, the filter may include materials that are untreated (non-hydrophobic). In these embodiments, the filter materials may include, for example, woven fibers, such as, for example, a precision woven mesh, non-woven fibers (e.g. felt), and/or any other material that, for example, helps reduce moisture ingress in a fluid flowing through the flow channel 12. The foregoing materials are merely illustrative and it is to be understood that any suitable hydrophobic material or hydrophobic treated material may be used to reduce moisture ingress in the flow channel 12 of the flow sensor.

In some embodiments, the filters 22 and 24 may include a backing for the filter materials, an adhesive applied to the materials for adhering to the material to the flow channel 12, and/or other insert (e.g. plastic ring, screen, etc.) for mounting the filter material to. In one example, the filter material may be mounted on a plastic ring, other insert, or backer, and pressed or otherwise inserted into or otherwise positioned to filter fluid flow entering the flow channel 12 of the flow sensor. In another example, an adhesive may be applied to a surface of the filter material for adhering the filter to the inside of the flow channel 12 or over a flow channel 12 port, as desired. An example backer for the filter material may be non-woven PET. Furthermore, it is contemplated that any other suitable technique or material may be used to mount the filters 22 and 24 to the flow sensor or flow sensor housing.

It is to be understood that the illustrative heater element 16 and sensing elements 18 and 20 are merely illustrative and, in some embodiments, may not be present, as desired. For example, it is contemplated that the filters 22 and 24 may be incorporated into one or more flow sensors (such as the flow sensors described and/or referred to previously), pressure sensors, acoustical sensors, optical sensors, pitot tubes, and/or any other suitable sensor or sensor combination that may be used to sense a measure related to a fluid (e.g. gas of liquid) in fluid channel 12, as desired.

Figure 3:
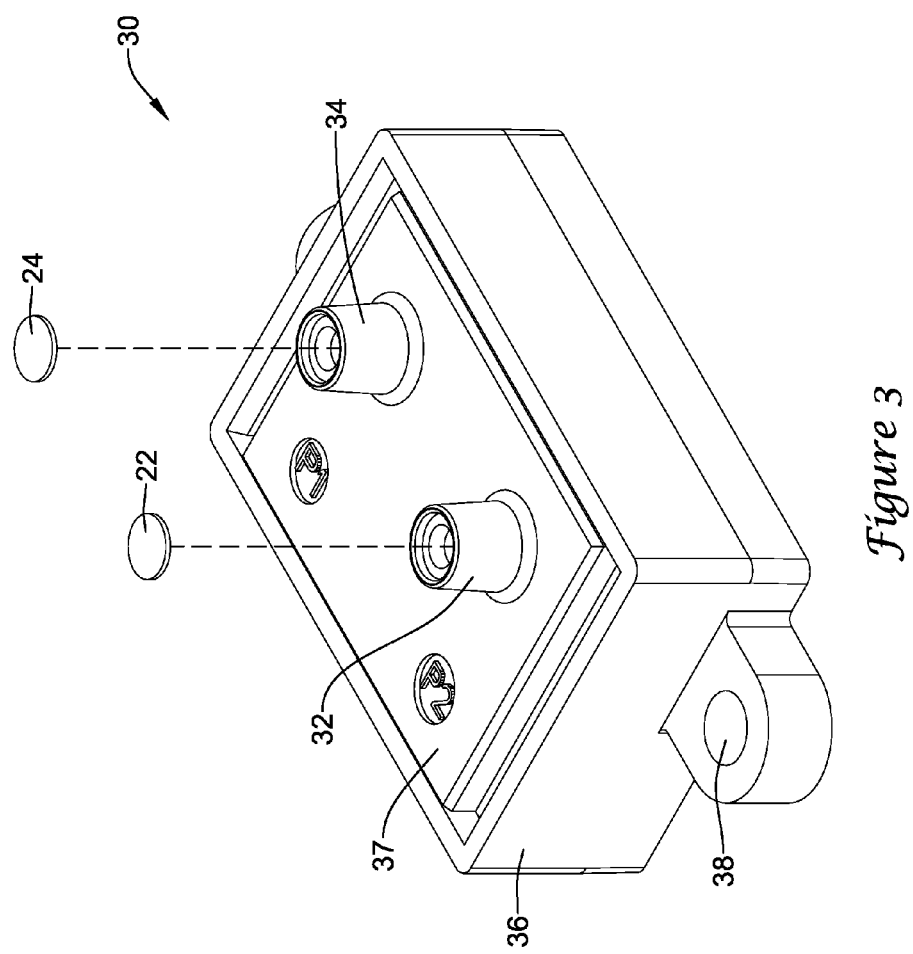
FIG. 3 is a partially exploded perspective view of an illustrative flow sensor assembly that includes one or more filters.

FIG. 3 is a partially exploded perspective view of an illustrative flow sensor assembly 30 that includes one or more filters 22 and/or 24. In the illustrative embodiment, the flow sensor assembly 30 includes an outer protective housing including a top protective cover 37 and a bottom protective cover 36. As illustrated, the top protective cover 37 may be inserted into a recess of the bottom protective cover 36. In such a configuration, the top and bottom protective covers 37 and 36 may protect the flow sensing element (shown as 42 in FIG. 4) and any signal conditioning circuitry that may be provided in the housing. In some cases, the top protective cover 37 and the bottom protective cover 36 may be formed from, for example, plastic. However, it is contemplated that any other suitable material may be used, as desired.

In the illustrative embodiment, the outer protective housing including the top protective cover 37 and the bottom protective cover 36 are formed as a composite. However, it is contemplated that the outer protective housing can be molded in a single piece from a plastic or other suitable material according to design considerations. For example, it is contemplated that the outer protective housing may be formed by injection molding or made by other suitable methods and materials, as desired.

As illustrated in FIG. 3, the top protective cover 37 of the housing includes a first flow port 32 and a second flow port 34, and helps define a flow channel extending therebetween. The flow sensing element is exposed to the fluid in the flow channel. In some cases, flow port 32 may be an inlet flow port, and flow port 34 may be an outlet flow port, but this is not required. In some cases, it is contemplated that the flow sensor assembly 30 may be a bi-directional flow sensor assembly and, in this case, either flow port 32 or flow port 34 may serve as the inlet flow port or the outlet flow port, depending on the current direction of the fluid flow through the flow channel.

Although not shown in FIG. 3, the flow sensor assembly 30 may include one or more electrical leads (shown as 44 in FIG. 4) electrically connected to the flow sensing element 42 and extending external of the outer protective housing. In some cases, the one or more electrical leads 44 may include a metal pin or trace, however, any suitable conducting material or configuration may be used, as desired.

In some embodiments, the outer protective housing may also include one or more mounting holes 38. As illustrated, bottom protective housing 36 includes two mounting holes 38, but any suitable number of mounting holes may be used, as desired. The mounting holes 38 may be configured to receive a fastener, such as a screw, bolt, or nail, to mount the bottom protective cover 36 to a desired surface to accommodate the particular equipment for which the flow sensor assembly 30 may be used. It is contemplated that bottom protective cover 36 or the top protective cover 37 may include additional mounting holes 38 or no mounting holes 38, as desired.

In the illustrative embodiment, filter 22 may be inserted, pressed, or otherwise positioned in, on, or adjacent to flow port 32. Filter 24 may be inserted, pressed, or otherwise positioned in, on, or adjacent to flow port 34. In some embodiments, the filters 22 and 24 may be generally cylindrical in shape. However, it is contemplated that any suitable shape may be used, depending on the shape of the port that the filter is to be inserted. In other cases, it is contemplated that the filters 22 and 24 may be any shape and, when inserted in the flow ports 32 and 34, the filters 22 and 24 may be deformable to accommodate the shape of the flow ports 32 and 34. In some instances, the filters 22 and 24 may be positioned in, on, or adjacent to flow ports 32 and 34, respectively, using an adhesive or other backing. In other instances, the filters 22 and 24 may be mounted on or formed on a backer or insert and pressed into flow ports 32 and 34, respectively. In yet other instances, the hydrophobic material of filters 22 and 24 can be inserted or pressed into flow ports 32 and 34, respectively, without any backer or insert.

The filters 22 and 24 can be configured to have a length in the flow direction and/or pore density that will produce a desired or predetermined pressure drop along the fluid channel at a given flow rate. For example, increasing the length, increasing the pore size and/or decreasing the pore density of the filters 22 and 24 may increase the pressure drop through the flow channel, whereas decreasing the length, increasing the pore size and/or increasing the pore density of the filters 22 and 24 may decrease the pressure drop. It is contemplated that any suitable length, pore size and/or pore density may be used for the filters 22 and 24, depending on the desired pressure drop and other considerations.

Figure 4:
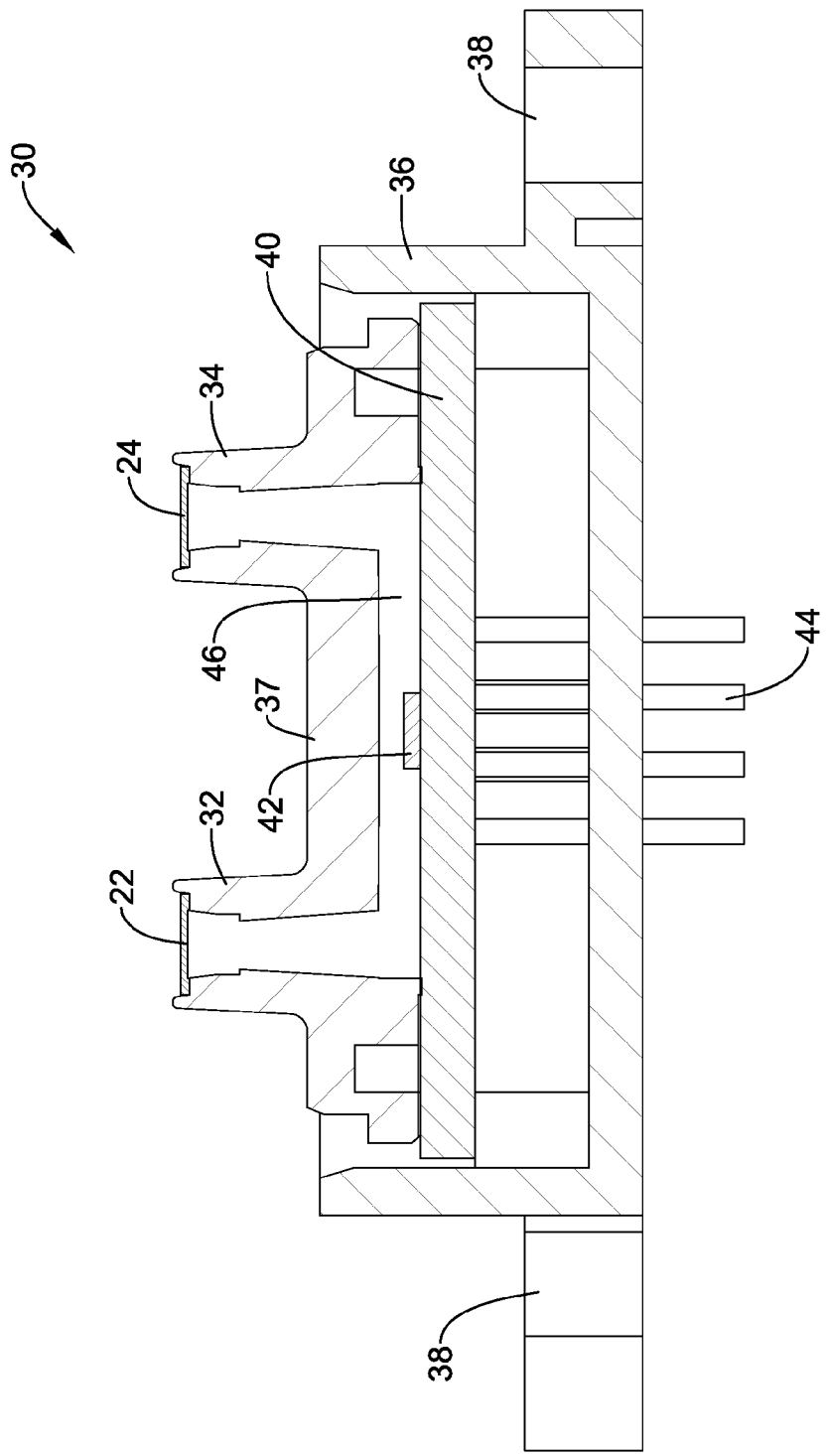
FIG. 4 is a cross-sectional view of the illustrative flow sensor assembly of FIG. 3 including filters adjacent to both the inlet and the outlet flow ports.
Figure 5:
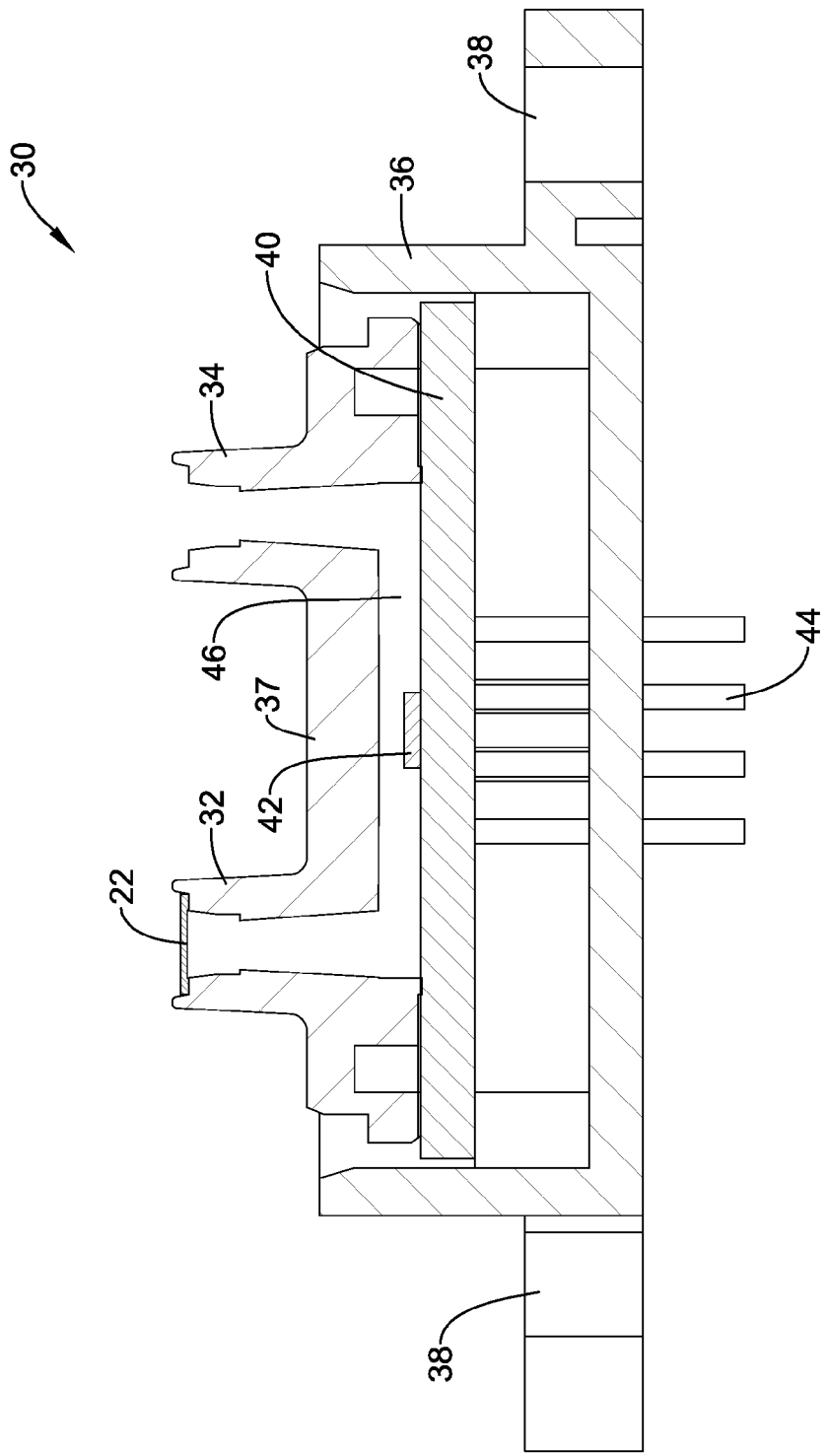
FIGS. 5 and 6 are cross-sectional views of the illustrative flow sensor assembly of FIG. 3 including a filter in only one of the inlet and outlet flow ports.
Figure 6:
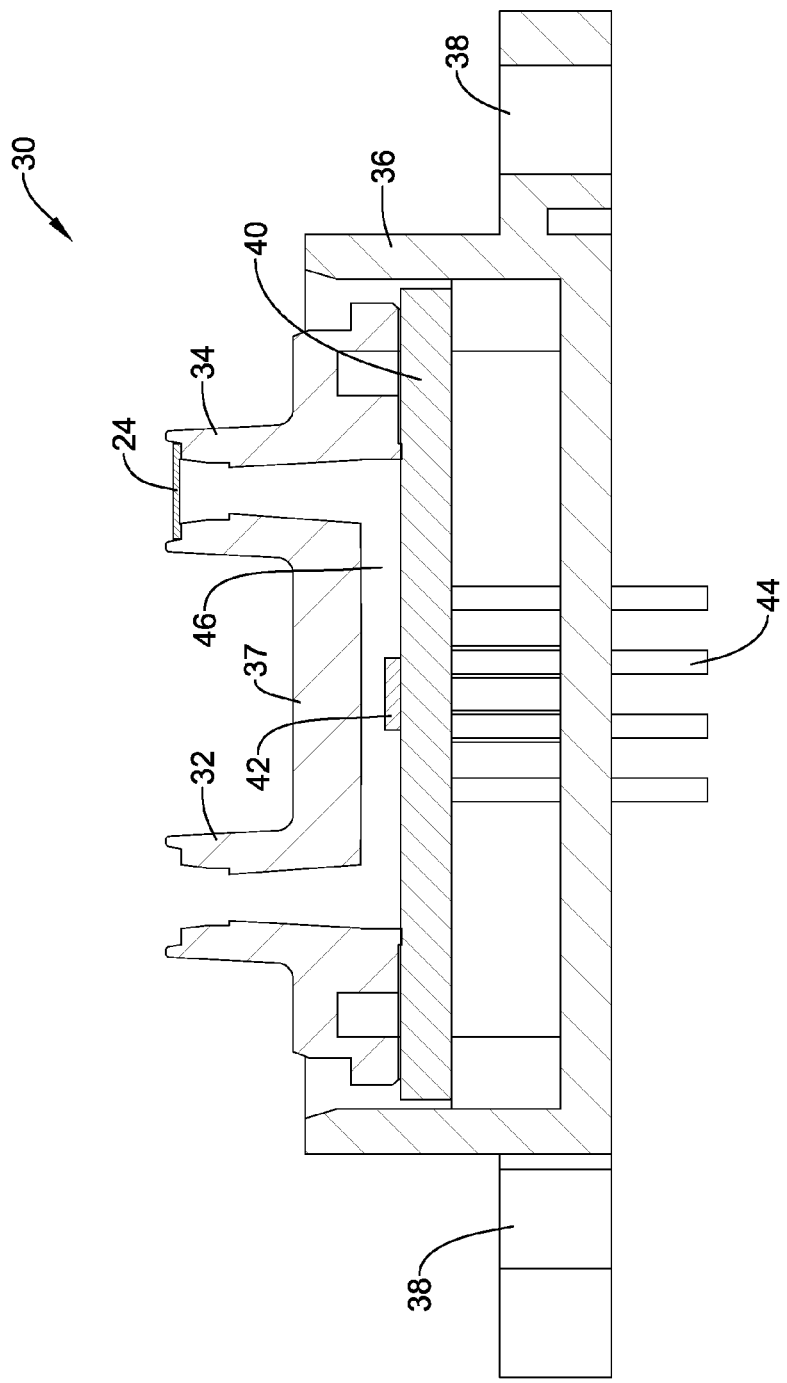

FIGS. 4-6 are cross-sectional views of the flow sensor assembly 30 of FIG. 3. In the illustrative embodiment of FIG. 4, the flow sensor assembly 30 may include a flow sensing element 42 mounted on a package substrate 40. The flow sensing element 42 may be configured to sense a measure related to flow rate of a fluid flowing through in flow channel 46. The package substrate 40 may include a ceramic material, however, other suitable types of material may be used, as desired.

In the illustrative embodiment, the housing of the flow sensor assembly 30 may include a top housing cover 37 and a bottom housing cover 36. As shown in FIGS. 4-6, the top housing cover 37 and bottom housing cover 36 may define a cavity for receiving package substrate 40 with the flow sensing element 42 mounted thereon. In the illustrative embodiment, an upper surface of the package substrate 40, which includes the flow sensing element 42, and an inner surface of the top housing cover 37 may define flow channel 46 of the flow sensor assembly 30. The flow channel 46 may extend from flow port 32 of the top housing cover 37, along the flow sensing element 42, and to flow port 34 of the top housing cover 37. The flow channel 46 may expose the flow sensing element 42 to a fluid flow.

As illustrated in FIG. 4, the flow sensor assembly 30 may include filter 22 disposed in flow port 32 and/or filter 24 disposed in flow port 34. The filters 22 and 24 may help reduce the introduction of moisture, dust, particulate matter, and/or other contaminants in the fluid flow and/or control the pressure drop across flow sensing element 42. As illustrated in FIGS. 5 and 6, only one filter 22 and 24 may be provided. As shown in FIG. 5, filter 22 is provided in flow port 32 without any filter provided in flow port 34. As shown in FIG. 6, filter 24 is provided in flow port 34 without any filter in flow port 32. While only one filter 22 or 24 is shown in the embodiments of FIGS. 5 and 6, the flow sensor assembly may still reduce moisture, dust, particulate matter, and/or other contaminants from entering the flow sensor and/or provide a controlled pressure drop across the flow sensing element 42.

While filters 22 and 24 are shown inserted into their respective flow ports 32 and 34, this is not meant to be limiting. It is contemplated that filters 22 and 24 may be mounted over or provided adjacent to their respective flow ports 32 and 34. Further, it is contemplated that the filters 22 and 24 can be provided in any suitable position to, for example, help reduce moisture, dust, particulate matter, and/or other contaminants in the fluid flow passing across the flow sensor and/or control the pressure drop in the fluid flow, as desired. For example, filters 22 and 24 may be provided in the flow channel 46 between the package substrate 40 and inner surface of the top housing cover 37, if desired.

In the illustrative embodiment, flow sensor assembly 30 may include one or more electrical leads 44 mounted to the package substrate 40. The one or more electrical leads 44 may be configured to receive one or more signals from the flow sensing element 42 corresponding to the sensed flow rate (and/or other parameter) of a fluid flowing through flow channel 42, via one or more traces (not shown) provided on the package substrate 40. In some cases, the one or more electrical leads 44 may be metal, however, it is contemplated that they may be any suitable conductive material, as desired.

In some embodiments, water ingress into flow sensors employing filters using hydrophobic 3 micrometer ePTFE on non-woven PET backer and hydrophobic non-woven material (i.e. Gore Acoustic filter) may be reduced. For example, the weight of the flow sensors may change by less than 0.01% when immersed in water, indicating little or no ingress of water. In one example, flow sensors including filters using hydrophobic 3 micrometer ePTFE membrane on non-woven PET backer was installed in a fixture including 80 milliliters of water. The apparatus was shaken with ten cycles for one orientation and then rotated 90 degrees, in which ten more cycles were then performed. This was repeated for four different orientations of the assembly. The pre-test weight and the post-test weight of the flow sensors were then compared. For the hydrophobic 3 micrometer ePTFE membrane on non-woven PET backer, two examples sensors weighed about 11.43 and 11.41 ounces. After the test, the two example sensors weighed about 11.44 and 11.42 ounces, respectively, or both had about a 0.01 ounce change. For hydrophobic non-woven material (e.g. Gore-GAW1020308), the three example flow sensors had a pre-test weight of about 11.20, 11.33, and 11.48 ounces. The post-test weight of the three example flow sensors was about 11.22, 11.34, and 11.49 ounces, respectively, or a change of about 0.02, 0.01, and 0.01 ounces, respectively.

In addition, the pressure drop was also measured for dry and wet hydrophobic non-woven material. For the three example flow sensor when dry, the pressure drop was about 20.81, 22.45, and 24.18 mm $H_2O$ for a 1000 standard cubic centimeters per minute (sccm) flow rate, about 16.06, 17.35, and 18.52 mm H2O for a 800 sccm flow rate, about 11.61, 12.57, and 13.31 mm H2O for a 600 sccm flow rate, about 7.481, 8.113, and 8.514 sccm for a flow rate of 400 sccm, about 3.638, 3.936, and 4.084 mm H2O at a flow rate of 200 sccm, about 1.664, 1.805, and 1.873 mm H2O for a flow rate of 100 sccm, about 1.238, 1.348, and 1.377 mm H2O for a flow rate of 70 sccm, about 1.059, 1.136, and 1.166 mm H2O for a flow rate of 60 sccm, and about 0.8639, 0.9360, and 0.9660 mm H2O for a flow rate of 50 sccm.

For a wet hydrophobic non-woven material, the three example filters for the flow sensor soaked in water for about 1 hour. The pressure drop for the wet hydrophobic non-woven material was about 20.61, 22.29, and 23.83 mm H2O for a 1000 sccm flow rate, about 15.90, 17.21, and 18.31 mm H2O for a 800 sccm flow rate, about 11.48, 12.43, and 13.19 mm H2O for a 600 sccm flow rate, about 7.405, 8.106, and 8.471 sccm for a flow rate of 400 sccm, about 3.586, 3.958, and 4.111 mm H2O at a flow rate of 200 sccm, and about 1.631, 1.861, and 1.927 mm H2O for a flow rate of 100 sccm.

For the hydrophobic 3 micrometer ePTFE membrane on non-woven PET backer, two examples sensors had pressure drops of about 133.0 and 136.3 mm H2O for a flow rate of 70 sccm, about 113.4 and 117.1 mm H2O for a flow rate of 60 sccm, and about 94.89 and 95.71 mm H2O for a flow rate of 50 sccm. As can be seen, the pressure drop of the hydrophobic non-woven filter (e.g. Gore-GAW1020308) was less than the hydrophobic 3 micrometer ePTFE membrane on non-woven PET backer. For some applications, a maximum pressure drop of about 5 mm H2O at 200 sccm is desired. For these applications, the hydrophobic non-woven material (e.g. Gore-GAW1020308) had acceptable pressure drops. However, the desired maximum pressure drop may vary depending on the application, and for some applications, a higher pressure drop may be acceptable or desirable.

Figure 7:
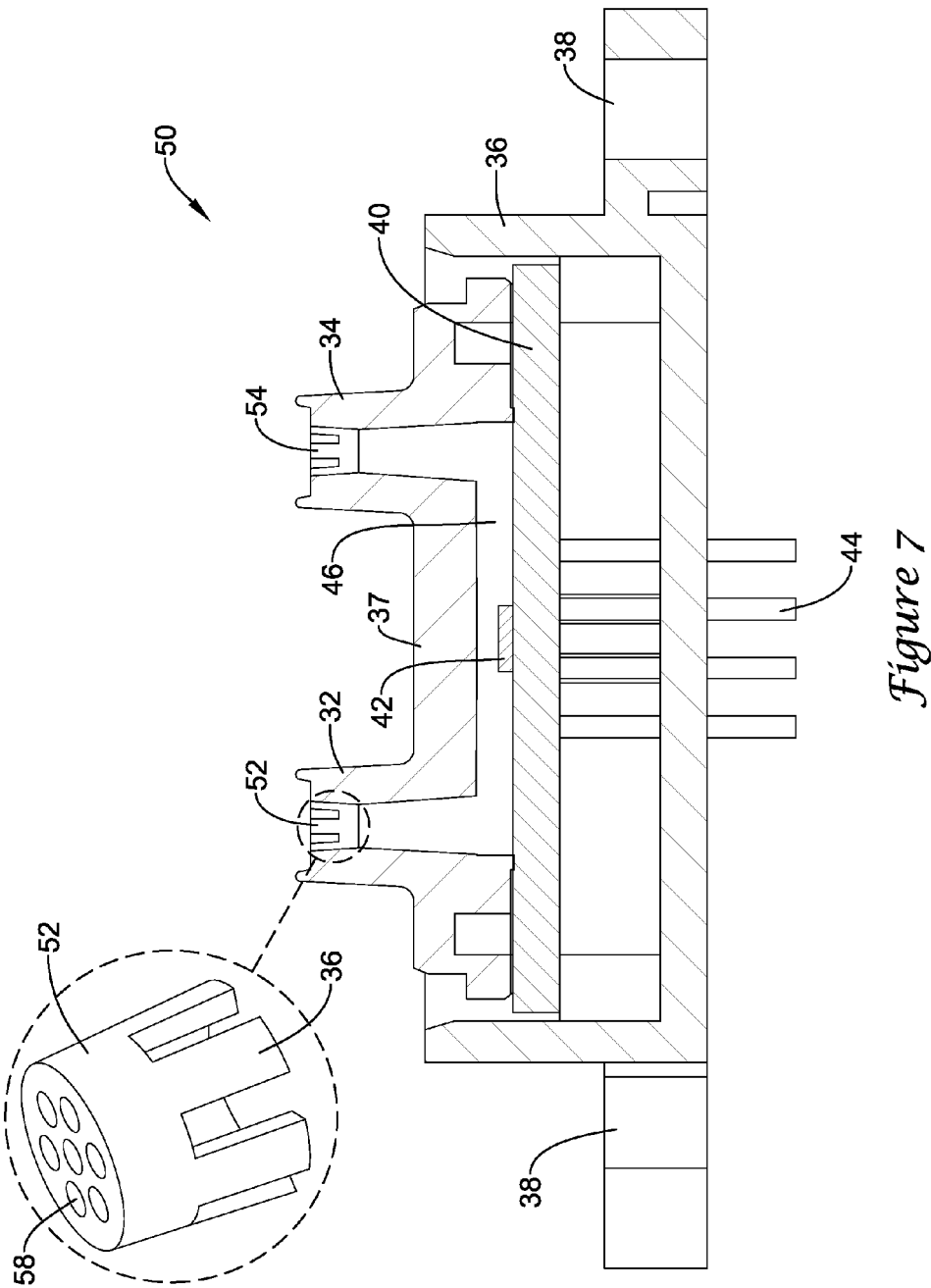
FIGS. 7-9 are cross-sectional views of other illustrative flow sensor assemblies that include one or more filter structures.
Figure 8:
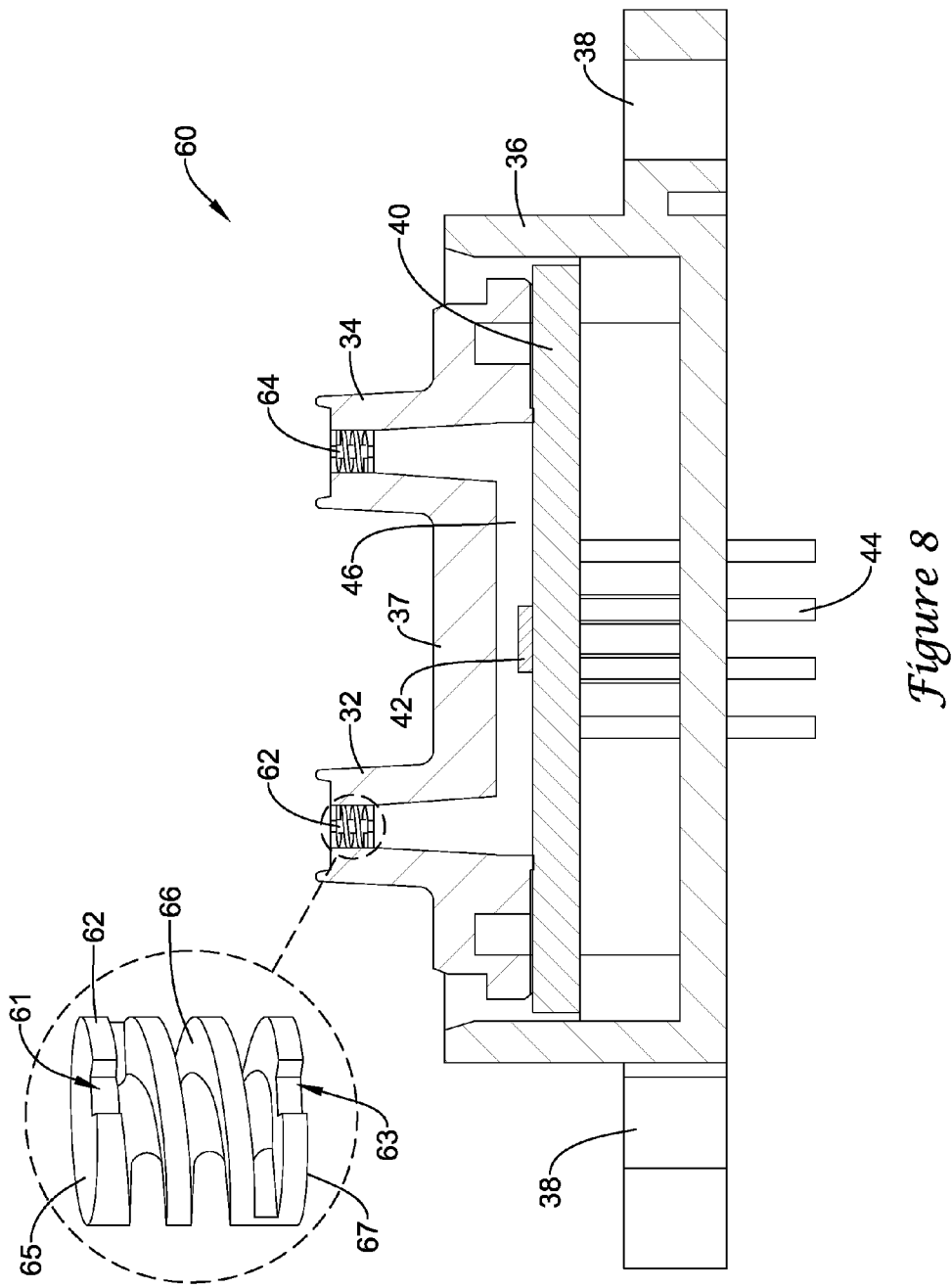
Figure 9:
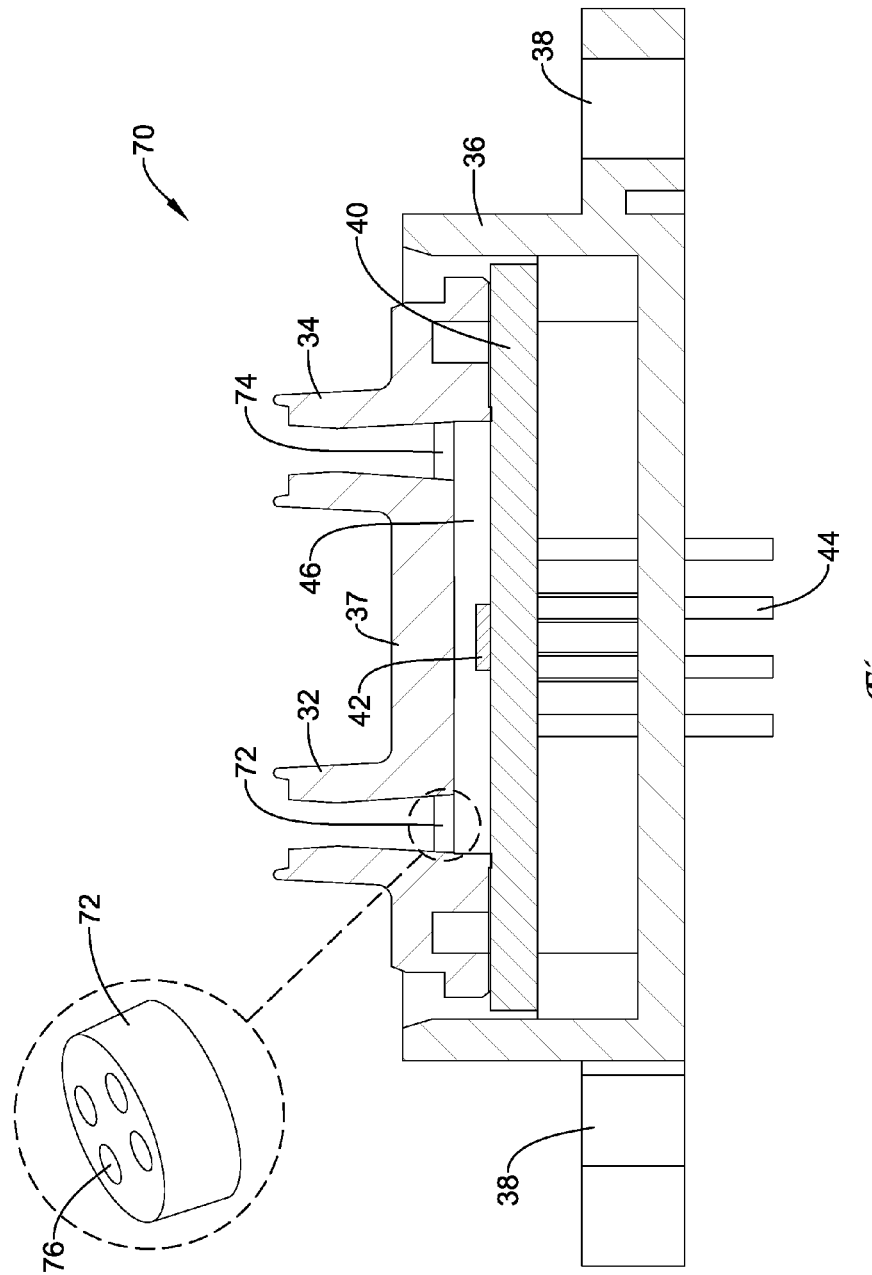

FIGS. 7-9 are cross-sectional views of other illustrative flow sensor assemblies 50, 60, and 70 similar to flow sensor 30, but has one or more alternative filters 52, 54, 62, 64, 72, and/or 74. While FIGS. 7-9 are shown having filters in the flow ports 32 and 34, it is to be understood that only one filter may be provided in either the upstream or downstream flow port, and/or in another location within the channel 46, as desired.

As shown in FIG. 7, filters 52 and 54 may be inserts including an end having a plurality of orifices 58 configured to reduce moisture, dust, particulate matter, and/or other contaminates in the fluid flow of flow sensor 50. The size of the orifices 58 may be small enough to help reduce water penetration because of surface tension. In the illustrative embodiment, filter 52 and 54 may also include one or more tabs 56 extending from the end of filters 52 and 54. The tabs 56 may be configured to be compressed by the flow ports 32 and 34 to maintain the filters 52 and 54 in flow ports 32 and 34, respectively. Filters 52 and 54 may also provide a desired pressure drop across the flow sensing element 42 depending on the size, number and/or density of orifices 58. In the illustrative example, filters 52 and 54 have seven orifices 58. However, it is contemplated that filters 52 and 54 may have two, three, four, five, six, seven, eight, nine, ten or any other number of orifices 58, as desired. In some cases, the size of orifices 58 may be on the order of hundredths of inches. For example, the diameter (or other dimension) of orifices 58 may be about 0.010 inches, 0.012 inches, 0.015 inches, 0.018 inches, 0.020 inches, 0.030 inches, or any other size, as desired.

As shown in FIG. 8, filters 62 and 64 may include a first end 65, a second end 67, and a tortuous path 66 extending between the two ends 65 and 67. For example, an upper end 65 of filters 62 and 64 may include an opening 61 and the bottom end 67 of filters 62 and 64 may include an opening 63. The tortuous path may extend from the opening 61 to opening 63, and may extend in a helical pattern in the filters 62 and 64 to help reduce moisture, dust, particulate matter, and/or other contaminants which may be present in the fluid flow from entering the flow channel 46 of the flow sensor 60.

As shown in FIG. 9, flow sensor 70 may include flow ports 32 and 34 having integral flow restrictors 72 and 74, respectively, to reduce moisture, dust, particulate matter, and/or other contaminants in the fluid flow of flow sensor 70. The flow restrictors 72 and 74 may include one or more orifices 76 utilizing surface tension to reduce moisture, dust, particulate matter, and/or other contaminants. The diameter of orifices 78 may be about 0.010 inches, 0.012 inches, 0.015 inches, 0.018 inches, 0.020 inches, 0.030 inches, or any other size, as desired. In the illustrative example, the flow restrictors 72 and 74 include four orifices 76 having a 0.015 inch diameter, but this is just one example.

A number of illustrative implementations have been described. Nevertheless, it will be understood that various modifications may be made without departing from the spirit and scope of this disclosure. Accordingly, other implementations are with the scope of the following claims.

What is claimed is:

1. A sensor assembly, comprising:
a housing including an inlet flow port and an outlet flow port, the housing defining a fluid channel extending between the inlet flow port and the outlet flow port;
a flow sensor positioned in the housing and exposed to the fluid channel, the flow sensor configured to sense a measure related to a flow rate of a fluid flowing through the fluid channel;
an upstream filter situated in the fluid channel of the housing upstream of the flow sensor, wherein the upstream filter includes a woven mesh; and
wherein during operation of the sensor assembly, a fluid passes through the inlet flow port, through the upstream filter, past the flow sensor, and through the outlet flow port, the upstream filter configured to reduce ingress of unwanted contaminates into the fluid channel and to the flow sensor.

2. The sensor assembly of claim 1 further comprising a downstream filter situated in the fluid channel of the housing downstream of the flow sensor.

3. The sensor assembly of claim 2, wherein the downstream filter includes a hydrophobic treated material.

4. The sensor assembly of claim 1, wherein the upstream filter is secured relative to the housing via a mounting insert and/or an adhesive.

5. The sensor assembly of claim 1, wherein the flow sensor includes a heater element and one or more sensors elements each exposed to the fluid in the fluid channel.

6. A sensor assembly, comprising:
a housing including an inlet flow port and an outlet flow port, the housing defining a fluid channel extending between the inlet flow port and the outlet flow port;
a sensor situated in the housing and exposed to the fluid channel, the sensor configured to sense a measure related to a property of a fluid flowing through the fluid channel;
a filter situated in the fluid channel of the housing upstream of the sensor, wherein the filter includes a woven mesh; and
wherein during operation of the sensor assembly, a fluid passes through the inlet flow port, through the filter, past the sensor, and through the outlet flow port.

7. The sensor assembly of claim 6, further comprising a mounting insert for mounting the filter relative to the housing.

8. The sensor assembly of claim 6, further comprising an adhesive for mounting the filter relative to the housing.

9. The flow sensor assembly of claim 6, wherein the sensor includes a heater element, a first sensing element positioned upstream of the heating element, and a second sensing element positioned downstream of the heating element.

10. The flow sensor assembly of claim 6, wherein the filter is configured to provide a predetermined pressure drop at a given flow rate.

11. The flow sensor assembly of claim 6, wherein the filter is an upstream filter, and the flow sensor assembly further includes a downstream filter situated in the fluid channel of the housing downstream of the sensor.

12. The flow sensor assembly of claim 11, wherein the upstream filter is positioned adjacent the inlet flow port, and the downstream filter is positioned adjacent the outlet flow port.

13. A sensor assembly, comprising:
a housing including a first port and a second port;
a sensor situated in the housing, the sensor in fluid communication with the first port and the second port, the sensor is configured to sense a measure related to a property of a fluid; and
a filter situated in the housing fluidly between the sensor and the first port.

14. The sensor assembly of claim 13, further comprising another filter situated in the housing fluidly between the sensor and the second port.

15. The sensor assembly of claim 13, wherein the filter includes a woven mesh.

16. The sensor assembly of claim 15, wherein the filter includes a hydrophobic woven mesh.

17. The sensor assembly of claim 15, wherein the filter includes a hydrophobic treated woven mesh.

18. The sensor assembly of claim 13, wherein the filter includes a non-woven mesh.

19. The sensor assembly of claim 18, wherein the filter includes a hydrophobic non-woven mesh.

20. The sensor assembly of claim 18, wherein the filter includes a hydrophobic treated non-woven mesh.

\* \* \* \* \*